(12) United States Patent
Kinoshita et al.

(10) Patent No.: US 11,977,472 B2
(45) Date of Patent: May 7, 2024

(54) APPLICATION OPERATION CONTROL DEVICE, APPLICATION OPERATION CONTROL METHOD, AND APPLICATION OPERATION CONTROL PROGRAM

(71) Applicant: NIPPON TELEGRAPH AND TELEPHONE CORPORATION, Tokyo (JP)

(72) Inventors: Kazumi Kinoshita, Tokyo (JP); Takeshi Nakatsuru, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 414 days.

(21) Appl. No.: 17/297,280

(22) PCT Filed: Nov. 13, 2019

(86) PCT No.: PCT/JP2019/044545
§ 371 (c)(1),
(2) Date: May 26, 2021

(87) PCT Pub. No.: WO2020/110726
PCT Pub. Date: Jun. 4, 2020

(65) Prior Publication Data
US 2022/0027256 A1 Jan. 27, 2022

(30) Foreign Application Priority Data
Nov. 29, 2018 (JP) ................. 2018-224106

(51) Int. Cl.
*G06F 11/36* (2006.01)
*G06F 21/64* (2013.01)

(52) U.S. Cl.
CPC .......... *G06F 11/3604* (2013.01); *G06F 21/64* (2013.01)

(58) Field of Classification Search
CPC ................. G06F 11/3604; G06F 21/64; G06F 2221/034; G06F 3/0619; G06F 3/0643;
(Continued)

(56) References Cited

U.S. PATENT DOCUMENTS 7,124,408 B1 * 10/2006 Parthasarathy ......... G06F 21/64
717/170
2004/0088331 A1 * 5/2004 Therrien ............. G06F 11/2094
707/999.009
(Continued)

FOREIGN PATENT DOCUMENTS

| EP | 2063379 A1 | 5/2009 |
| EP | 1399808 B1 | 3/2010 |
| JP | 2009-080772 A | 4/2009 |

OTHER PUBLICATIONS

"Sophos Anti-Virus for Linux: Fanotify Overview" English page Internet URL: https://community.sophos.com/kb/ja-p/118216, Retrieved on Nov. 19, 2018.
(Continued)

*Primary Examiner* — Baotran N To

(57) ABSTRACT

An application operation control device includes processing circuitry configured to store associated file information that indicates, in association with each other, an application and an associated file that is a file whose integrity is to be verified when integrity of the application is determined, and associated application information that indicates, in association with each other, the application and an associated application that is an application that is potentially affected when the integrity of the application is damaged, determine integrity of the associated file of the application, and in a case where, among a plurality of the associated files of the application, integrity of any of the plurality of the associated files is determined to be damaged, extract, as a target application for operation control, an application associated
(Continued)

with an associated file the integrity of which is determined to be damaged from the associated file information.

8 Claims, 5 Drawing Sheets

(58) Field of Classification Search
CPC ............... G06F 3/0673; G06F 11/0706; G06F 11/0751; G06F 21/52; G06F 16/137; G06F 21/51
See application file for complete search history.

(56) References Cited

U.S. PATENT DOCUMENTS

| | | | |
|---|---|---|---|
| 2004/0220975 A1* | 11/2004 | Carpentier | G06F 21/64 |
| 2009/0193522 A1* | 7/2009 | Ishikawa | G06F 21/57 |
| | | | 726/22 |
| 2012/0291138 A1* | 11/2012 | Haga | G06F 21/54 |
| | | | 726/27 |

OTHER PUBLICATIONS

"Tripwire Enterprise" Internet Machine Translation, URL: https://www.tripwire.co.jp/products/enterprise/ Retrieved on Nov. 19, 2018.

* cited by examiner

| APPLICATION | FILE PATH OF ASSOCIATED FILE |
|---|---|
| AP1 | /a/b/f1 |
|  | /c/f2 |
| AP2 | /x/y/f3 |

Fig. 3

| FILE PATH | DIGEST VALUE |
|---|---|
| /a/b/f1 | 123456abcd |
| /c/f2 | 9876aabbbb |
| ...... |  |

Fig. 4

| APPLICATION | ASSOCIATED APPLICATION |
|---|---|
| AP1 | AP3 |
| AP3 | AP1 |
|  | AP4 (REDUNDANCY OF AP1) |
|  | AP5 |
| AP5 | AP3 |

APPLICATION OPERATION CONTROL DEVICE, APPLICATION OPERATION CONTROL METHOD, AND APPLICATION OPERATION CONTROL PROGRAM

CROSS-REFERENCE TO RELATED APPLICATIONS

This application is a U.S. 371 Application of International Patent Application No. PCT/JP2019/044545, filed on 13 Nov. 2019, which application claims priority to and the benefit of JP Application No. 2018-224106, filed on 29 Nov. 2018, the disclosures of which are hereby incorporated herein by reference in their entireties.

TECHNICAL FIELD

The present invention relates to an application operation control device, an application operation control method, and an application operation control program.

BACKGROUND ART

In order to prevent an application from operating abnormally, it is necessary that the application is not set in operation in a state where its integrity is damaged. Note that an operating state refers to a state in which the process is generated (that is, provided with a process ID), and not in an operating state (stopped state) refers to a state in which the process is stopped.

What is associated with the operation of the application is here, for example, as follows.
(1) Those managed by an application developer (for example, application execution files, configuration files, libraries, and the like)
(2) Those managed by those other than the application developer and directly related to operation (for example, shared libraries, and the like)
(3) Those managed by those other than the application developer, and not directly related to operation, but required in service offerings (for example, other applications that operate in cooperation with the application, and the like)

That is, in order to prevent an application from operating abnormally, it is necessary to control operation of the application according to a verification result of integrity of those (for example, files and applications) related to the operations of the application.

For example, the case that three applications (APs) of AP1 through AP3 cooperate to provide a service will be considered. In this case, in order to properly operate the service, it is necessary not only verifying the integrity of AP1 to control the operation, but also verifying the integrity of AP2 and AP3 to control the operation.

CITATION LIST

Patent Literature

Patent Literature 1: Japanese Laid-open Patent Publication No. 2009-80772 A

Non Patent Literature

Non Patent Literature 1: Sophos Anti-Virus for Linux: Fanotify Overview, [Retrieved on Nov. 19, 2018], Internet <URL: https://community.sophos.com/kb/ja-jp/118216>

Non Patent Literature 2: Tripwire Enterprise, [Retrieved on Nov. 19, 2018], Internet <URL: https://www.tripwire.co.jp/products/enterprise/>

SUMMARY OF THE INVENTION

Technical Problem

However, the related art (for example, techniques described in PTL 1 and Non Patent Literatures 1 and 2) has not been able to address abnormal operations due to files associated with applications. Thus, an object of the present invention is to prevent abnormal operations due to files associated with applications.

Means for Solving the Problem

In order to solve the problems described above, the present invention application operation control device includes processing circuitry configured to a storage configured to store associated file information that indicates, in association with each other, an application and an associated file that is a file whose integrity is to be verified when integrity of the application is determined, and associated application information that indicates, in association with each other, the application and an associated application that is an application that is potentially affected when the integrity of the application is damaged determine integrity of the associated file of the application, and in a case where, among a plurality of the associated files of the application, integrity of any of the plurality of the associated files is determined to be damaged, extract, as a target application for operation control, an application associated with an associated file the integrity of which is determined to be damaged from the associated file information, and extract an associated application associated with the application that is extracted from the associated application information.

Effects of the Invention

According to the present invention, it is possible to prevent abnormal operations due to files associated with applications.

BRIEF DESCRIPTION OF DRAWINGS

FIG. 3 is a diagram illustrating an example of associated file information of FIG. 1.

FIG. 4 is a diagram illustrating an example of correct answer information of FIG. 1.

DESCRIPTION OF EMBODIMENTS

Figures 1, 2:
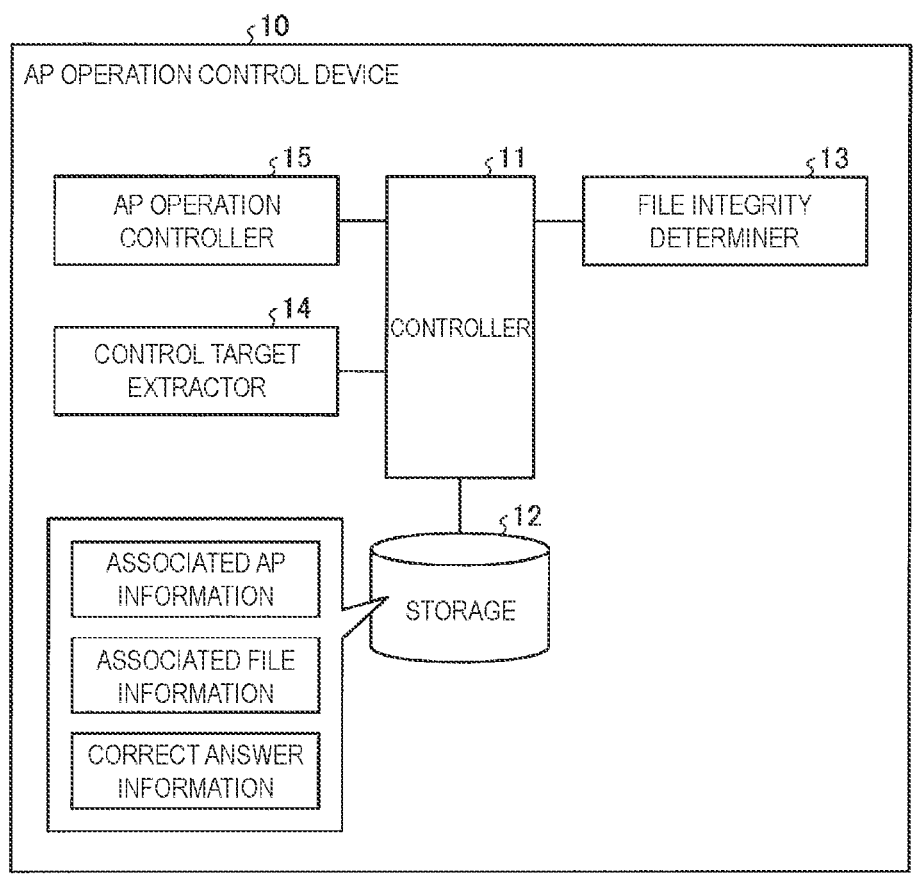
FIG. 1 is a diagram illustrating a configuration example of an application (AP) operation control device.
FIG. 2 is a diagram illustrating an example of associated AP information of FIG. 1.

Hereinafter, embodiments of the present invention will be described with reference to the drawings. A configuration example of an application (AP) operation control device 10 of the present embodiment will be described using FIG. 1. Note that the AP to be controlled by the AP operation control device 10 may be an AP operating within the AP operation control device 10, or may be an AP operating outside the AP operation control device 10.

Configuration

The AP operation control device 10 is a device for performing AP operation control, and includes, for example, a controller 11, a storage 12, a file integrity determiner (determiner) 13, a control target extractor 14, and an AP operation controller 15.

The controller 11 controls the storage 12, the file integrity determiner 13, the control target extractor 14, and the AP operation controller 15.

The storage 12 stores associated AP information, associated file information, and correct answer information.

The associated AP information is information indicating APs that may be affected if the AP integrity is damaged for each AP. This associated AP information is information indicating, for example, the process name of an AP (associated AP) associated with an operation of the AP for each AP (see FIG. 2). Note that instead of the process name of the associated AP in the associated AP information, for example, the file path name of the execution file of the associated AP may be used.

The associated file information is information that indicates a file whose integrity is to be verified when the integrity of the AP is determined for each AP. In other words, the associated file information is information indicating an AP that may be affected if the integrity of a file (associated file) is damaged.

The associated file information is, for example, information indicating a file path of a file (associated file) associated with an operation of the AP for each AP (see FIG. 3). For example, the associated file information illustrated in FIG. 3 indicates that all associated files of the file paths associated with AP1 ("/a/b/f1" and "/c/f2") need to be verified for integrity when it is desired to determine the integrity of AP1. The associated file information illustrated in FIG. 3 also indicates that an AP likely to be affected is "AP1" if the integrity of any of the associated file of the file paths "/a/b/f1" and "/c/f2" is damaged.

The correct answer information is information used to determine the integrity of the associated file. For example, a digest value of the file data is used as the correct answer information. For example, the correct answer information illustrated in FIG. 4 is information in which the file path of the associated file and the digest value of the file data for the file path are associated with each other. For example, in the correct answer information illustrated in FIG. 4, in a case where the digest value of the associated file of the file path "/a/b/f1" is "123456abcd", it is determined that the integrity of the associated file is not damaged.

Further, the correct answer information may be information indicating a directory path in which the associated file is stored and a file or file path directly below the directory.

Figures 5, 6:
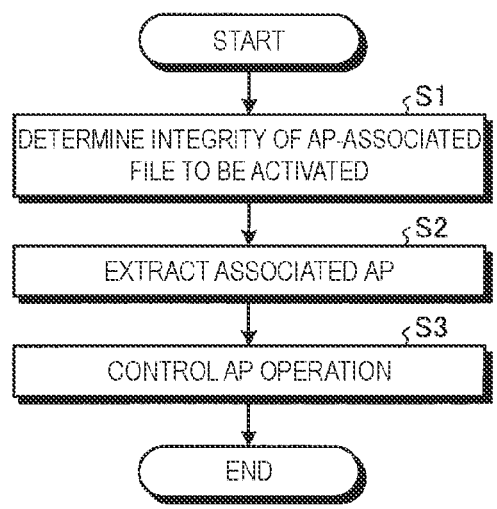
FIG. 5 is a diagram illustrating an example of correct answer information of FIG. 1.
FIG. 6 is a flowchart illustrating an example of a processing procedure of an AP operation control device of FIG. 1.

For example, the correct answer information illustrated in FIG. 5 is information in which the directory path where the associated file is stored (verification target directory path) is associated with one or more file paths directly below the directory. For example, in a case where the directory path in which the associated file is stored is "/ab/d1/", the correct answer information illustrated in FIG. 5 indicates that the integrity of the associated file is not damaged if the following fact is verified. The following fact is that the file paths "/a/b/d1/f1", "/a/b/d1/f5", and "/a/b/d1/d3" are present directly below the directory path with no excess or deficiency.

Note that in addition to the above, information indicating the file owner information, permission, and the like, of the associated file may be used as the correct answer information.

Next, the file integrity determiner 13 will be described. The file integrity determiner 13 compares the associated file of the AP to the correct answer information of the associated file to determine the integrity of the associated file.

For example, the file integrity determiner 13 calculates the digest value of the associated file for each associated file of AP1 illustrated in the associated file information (see FIG. 3). Then, if the digest value obtained at the calculating matches the digest value of the associated file indicated in the correct answer information (see FIG. 4), the file integrity determiner 13 determines that integrity is not damaged. On the other hand, the file integrity determiner 13 calculates the digest value of the associated file, and determines that the integrity of the associated file is damaged if the digest value obtained at the calculating does not match the digest value of the associated file indicated in the correct answer information (see FIG. 4). Then, in a case where the file integrity determiner 13 determines that the integrity of at least one of the associated files of the AP is damaged, the file integrity determiner 13 notifies the control target extractor 14 of the associated file whose integrity is determined to be damaged.

The control target extractor 14 extracts the AP to be controlled. Specifically, the control target extractor 14 extracts the AP associated with the associated file whose integrity is determined to be damaged by the file integrity determiner 13 from the associated file information (see FIG. 3). The control target extractor 14 extracts the associated AP associated with the extracted AP from the associated AP information (see FIG. 2).

For example, it is considered a case where the file integrity determiner 13 determines that the integrity of the associated file of the file path "/a/b/f1" is damaged among the associated files indicated in the associated file information illustrated in FIG. 3.

In this case, the control target extractor 14 extracts AP1 associated with the file path "/a/b/f1" from the associated file information illustrated in FIG. 3. Next, the control target extractor 14 extracts the associated AP (AP3) associated with AP1 from the associated AP information (see FIG. 2).

If there is further associated AP associated with the extracted associated AP in the associated AP information, the control target extractor 14 also extracts the associated AP. The control target extractor 14 repeats such processing until the associated AP is not extracted.

For example, the control target extractor 14 extracts AP5 which is an associated AP of AP3 from the associated AP information illustrated in FIG. 2. Note that in the associated AP information illustrated in FIG. 2, AP1 is described as the associated AP of AP3, but AP1 has already been extracted and thus is not extracted. In addition, although AP3 is described as the associated AP of AP5 in the associated AP information illustrated in FIG. 2, the control target extractor 14 does not extract AP3 because it has already been extracted. With the processing described above, the control target extractor 14 extracts AP3 and AP5 from the associated AP information illustrated in FIG. 2. The control target extractor 14 outputs AP1 extracted from the associated file information and AP3 and AP5 extracted from the associated AP information to the AP operation controller 15.

The AP operation controller 15 performs operation control of the AP extracted by the control target extractor 14. For example, in a case where AP1, AP3, and AP5 extracted by the control target extractor 14 are running, the AP operation controller 15 stops these APs.

Such AP operation control device 10 can prevent abnormal operations due to the associated file of the AP.

Processing Procedure

Next, an example of a processing procedure of the AP operation control device 10 will be described with reference to FIG. 6. Further, here, an example is given of a case where the AP operation control device 10 determines the integrity of the associated file of the AP to be activated.

The file integrity determiner 13 of the AP operation control device 10 determines the integrity of the associated file of the AP to be activated (S1).

For example, the file integrity determiner 13 uses the correct answer information of the storage 12 to determine the integrity for all associated files of the AP to be activated which is extracted from the associated file information (see FIG. 3).

Here, in a case where the file integrity determiner 13 determines that the integrity is damaged in any of the associated files among the associated files of the AP, the file integrity determiner 13 notifies the control target extractor 14 of the associated file the integrity of which is damaged. Also, the file integrity determiner 13 notifies the AP operation controller 15 of a determination result that the integrity of the associated file is damaged.

In a case where the file integrity determiner 13 determines that the integrity of any of the associated files of the AP is not damaged, the file integrity determiner 13 notifies the AP operation controller 15 of the determination result that the integrity of any of the associated files of the AP is not damaged.

After S1, the control target extractor 14 extracts, based on the associated file notified by the file integrity determiner 13 (S2), the associated AP of the AP associated with that associated file.

For example, first, the control target extractor 14 extracts, from the associated file information (see FIG. 3), an AP associated with the associated file notified by the file integrity determiner 13 in S1. Also, the control target extractor 14 extracts the associated AP of the extracted AP from the associated AP information (see FIG. 2). Then, the control target extractor 14 notifies the AP operation controller 15 of the extracted AP and the associated AP of the extracted AP.

After S3, the AP operation controller 15 controls the operation of the AP extracted by the control target extractor 14 (S3).

For example, in a case where the determination result notified by the file integrity determiner 13 is that the integrity of any of the associated files of the AP to be activated is damaged, the AP operation controller 15 causes the AP notified by the control target extractor 14 to transition to a stopped state. Here, the AP notified by the control target extractor 14 is the AP to be activated and the associated AP of the AP to be activated.

On the other hand, in a case where the determination result notified by the file integrity determiner 13 is that the integrity of none of the associated files of the AP to be activated is damaged, the AP operation controller 15 activates the AP (transition to the operating state). Note that when the AP is in a recording mode in a case where the determination result notified by the file integrity determiner 13 is that the integrity of any of the associated files of the AP to be activated is damaged, the AP operation controller 15 activates the AP (transition to the operating state). Here, the fact that the AP is in the recording mode means that the AP is in a mode in which the operation control is not performed even in a case where the integrity of the associated file of the AP is damaged.

Note that in the above example, the description has been given, as an example, of a case where the AP operation control device 10 determines the integrity of the associated file of the AP to be activated, but it is not limited thereto. For example, the AP operation control device 10 may determine the integrity of the associated file of the AP in operation as a target. Further, the AP operation control device 10 may determine the integrity of the associated file on the occasion that any of the associated files indicated in the associated file information has been accessed.

According to the AP operation control device 10 described above, abnormal operations due to abnormalities in the associated file of the AP can be prevented.

Note that in a case where the target AP of operation control by the AP operation control device 10 described above is in a redundant configuration, the AP operation control device 10 may target the associated AP of the AP for operation control only after the integrity of all of the APs in the redundant configuration are damaged.

For example, it is considered a case where AP4 is present as a redundant configuration of AP1 and the integrity of AP1 is damaged but the integrity of AP4 is not damaged. In this case, the AP operation control device 10 determines that the integrity of AP3 is not damaged because the associated AP of AP1 is AP3 in the associated AP information illustrated in FIG. 7 but the integrity of AP4 which is a redundant configuration of AP1 is not damaged. Thus, the AP operation control device 10 does not target AP3 for operation control. On the other hand, in a case where the integrity of both AP1 and AP4 are damaged, the AP operation control device 10 targets AP3 and AP5, which are the associated APs of AP1 and AP4, for operation control.

Figures 7, 8:
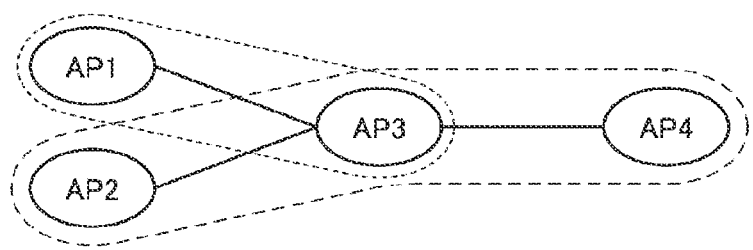
FIG. 7 is a diagram illustrating an example of associated AP information including an AP of a redundant configuration.
FIG. 8 is a diagram illustrating an example of AP groups operating in cooperation with each other.
Figure 9:
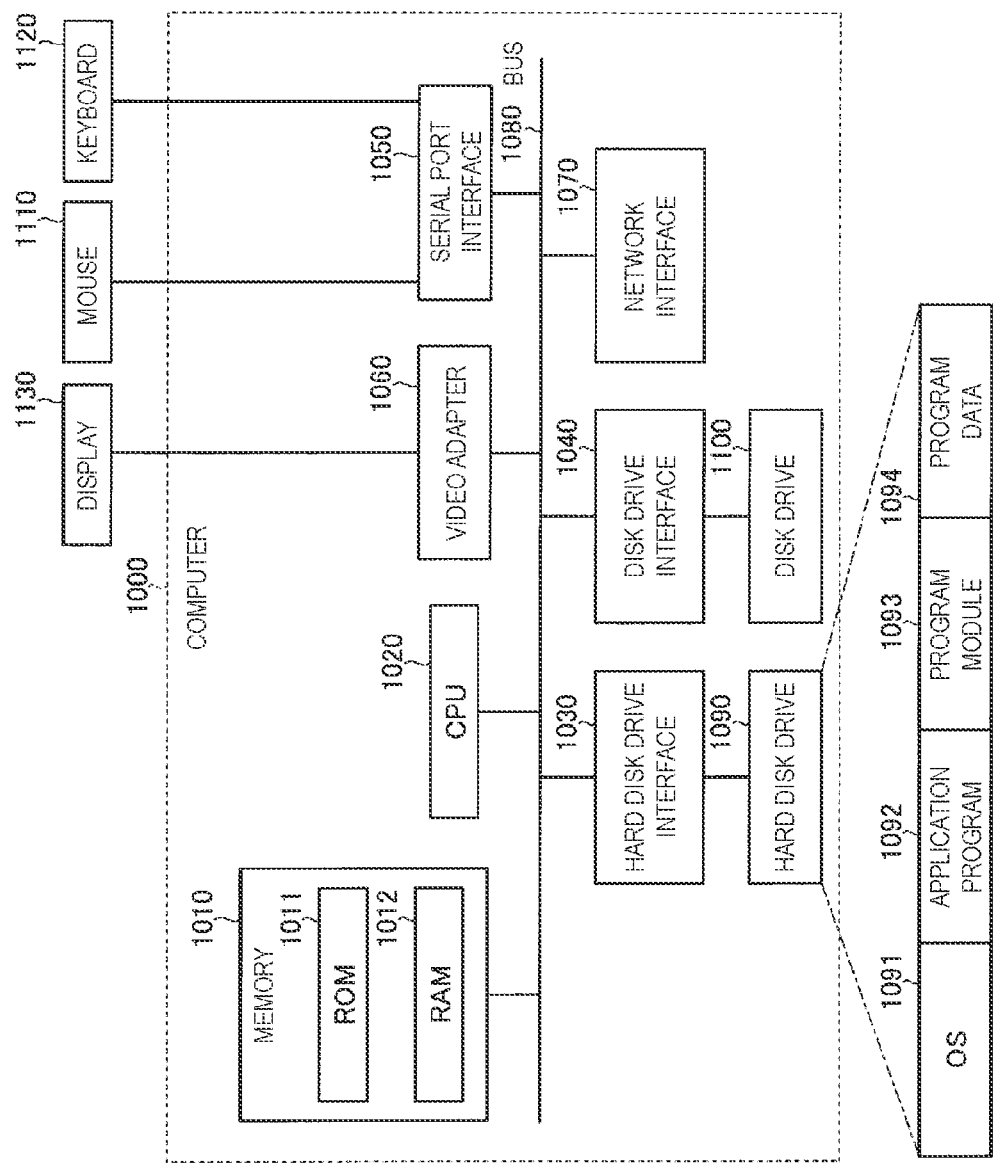
FIG. 9 is a diagram illustrating an example of a computer that executes an AP operation control program.

Also, the associated APs, which are clearly not affected even if the integrity is damaged, for example, in a case where there are multiple types of APs that operate in cooperation, may be excluded from the operation control target. For example, as illustrated in FIG. 8, it is considered a case where AP1 and AP3 operate in cooperation, and AP2, AP3, and A4 operate in cooperation, and for example, even if the integrity of AP4 is damaged, AP1 is not affected. In this case, the AP operation control device 10 does not target the AP1 for operation control even if the integrity of AP4 is damaged.

The AP operation control device 10 may only output an alert without performing the operation control of the APs as described above, even if it is determined that the integrity is damaged in any AP.

Program

The functions of the AP operation control device 10 described in the embodiments described above can be implemented by installing a program that achieves such functions into a desired information processor (computer). For example, the information processor can function as the AP operation control device 10 by causing the information processor to execute the above-mentioned program provided as package software or online software. The information processor described here includes a desktop or laptop personal computer, a rack-mount type server computer, and the like. Further, a mobile communication terminal such as a smartphone, a mobile phone, a personal handyphone system (PHS), and a personal digital assistant (PDA), and the like, in addition to the above, are included in a category of the information processor. The AP operation control device 10 may also be implemented on a cloud server.

One example of a computer that executes the program (AP operation control program) described above will be described with reference to FIG. 7. As illustrated in FIG. 7, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100). A removable storage medium such as a magnetic disk or an optical disk is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 7. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as appropriate, and executes each of the aforementioned procedures.

The program module 1093 and the program data 1094 related to the AP operation control program described above are not necessarily stored in the hard disk drive 1090. For example, the program module 1093 and the program data 1094 may be stored in a removable storage medium and read out by the CPU 1020 via the disk drive 1100 or the like. Alternatively, the program module 1093 and the program data 1094 related to the program described above may be stored in another computer connected via a network such as a LAN or a wide area network (WAN), and may be read by the CPU 1020 via the network interface 1070.

REFERENCE SIGNS LIST

10 AP operation control device
11 Controller
12 Storage
13 File integrity determiner
14 Control target extractor
15 AP operation controller

The invention claimed is:

1. An application operation control device comprising: processing circuitry configured to:
store associated file information that indicates, in association with each other, an application and an associated file that is a file whose integrity is to be verified when integrity of the application is determined, and associated application information that indicates, in association with each other, the application and an associated application that is an application that is potentially affected when the integrity of the application is damaged, wherein the associated file information is distinct from the associated application information;
determine integrity of the associated file of the application; and
in a case where, among a plurality of the associated files of the application, integrity of any of the plurality of the associated files is determined to be damaged, extract, as a first target application for operation control, an application associated with an associated file the integrity of which is determined to be damaged from the associated file information, and extract, as a second target application for operation control, an associated application associated with the application that is extracted from the associated application information.

2. The application operation control device according to claim 1, wherein the processing circuitry is further configured to:
calculate a digest value of the associated file, and compare the digest value that is obtained at the calculating and a digest value of the associated file stored in the storage in advance to determine integrity of the associated file.

3. The application operation control device according to claim 1, wherein the processing circuitry is further configured to:
determine the integrity of an associated file of an application to be activated.

4. The application operation control device according to claim 1, wherein the processing circuitry is further configured to:
determine the integrity of an associated file of an application in operation.

5. The application operation control device according to claim 1, wherein the processing circuitry is further configured to:
repeat, in a case where, in the associated application information, there is a further associated application that is associated with the associated application that is extracted, processing of extracting the further associated application that is associated with the associated application that is extracted, from the associated application information until no new instance of the further associated application is extracted.

6. The application operation control device according to claim 1, wherein the processing circuitry is further configured to:
perform operation control on an application extracted as the target application for operation control.

7. An application operation control method comprising:
referring to associated file information that indicates, in association with each other, an application and an associated file that is a file whose integrity is to be verified when integrity of the application is determined, to determine integrity of the associated file of the application;
in a case where, among a plurality of the associated files of the application, integrity of any of the plurality of the associated files is determined to be damaged,
extracting, as a first target application for operation control, an application associated with an associated file the integrity of which is determined to be damaged from the associated file information; and
extracting, as a second target application for operation control, an associated application associated with the application that is extracted from associated application information that indicates, in association with each other, the application and an associated application that is an application that is potentially affected when the integrity of the application is damaged, by processing circuitry, wherein the associated application information is distinct from the associated file information.

8. A non-transitory computer-readable recording medium storing therein an application operation control program that causes a computer to execute a process comprising:
 referring to associated file information that indicates, in association with each other, an application and an associated file that is a file whose integrity is to be verified when integrity of the application is determined, to determine integrity of the associated file of the application;
 in a case where, among a plurality of the associated files of the application, integrity of any of the plurality of the associated files is determined to be damaged,
 extracting, as a first target application for operation control, an application associated with an associated file the integrity of which is determined to be damaged from the associated file information; and
 extracting, as a second target application for operation control, an associated application associated with the application that is extracted from associated application information that indicates, in association with each other, the application and an associated application that is an application that is potentially affected when the integrity of the application is damaged, wherein the associated file information is distinct from the associated application information.

* * * * *